Figure 2:
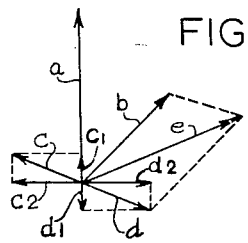

March 8, 1949.　　　　H. W. PHAIR　　　　2,464,057
EARTH INDUCTOR COMPASS
Filed Nov. 23, 1944

*INVENTOR.*
HARRY W. PHAIR
BY Mueller, Dodds + Mason
ATTORNEYS

Patented Mar. 8, 1949

2,464,057

UNITED STATES PATENT OFFICE 2,464,057

EARTH INDUCTOR COMPASS

Harry W. Phair, Lyndhurst, N. J., assignor to Fairchild Camera and Instrument Corporation, a corporation of Delaware Application November 23, 1944, Serial No. 564,821

6 Claims. (Cl. 33—204)

This invention relates to earth-inductor compasses and more particularly to such compasses of the type including an arrangement for compensating for errors introduced by a local permanent magnetic field. While the invention is of general application, it is particularly suitable for use in earth-inductor compasses carried by ships, aircraft or other mobile vehicles. The term "permanent magnetic field" as used herein denotes a magnetic field which is reasonably stable; that is, does not fluctuate rapidly, although it may be subject to slow, long-time variations.

It is well known that, in the use of earth-inductor compasses, that is, compasses of the type comprising a small alternating-current generator excited by the earth's magnetic field, errors are introduced into the reading of the compass due to local permanent magnetic fields. For example, when such a compass is used on a ship, the ship may become permanently magnetized either longitudinally, transversely, or in a direction having both longitudinal and transverse components, as a result of which the compass does not indicate true magnetic north. Heretofore, there have been proposed various arrangements for compensating for such errors by the use of one or more small adjustable permanent magnets in the immediate vicinity of the compass element. Such magnets are then adjusted by trial and error until the compass reads as correctly as possible when the compass, and the vehicle on which it is mounted, is oriented successively on the four magnetic headings of North, East, South and West. Such orientation may be effected by sighting from the vehicle on objects having known bearings. Any residual errors, such as those due to the so-called "soft-iron effect," are then often recorded on a compass-correction card which is posted in the vicinity of the compass.

However, the prior art arrangements for compensating earth-inductor compasses for local permanent fields have a number of disadvantages. In the first place, changes in the attitude of the vehicle, that is the pitch or roll of a ship or bank or climb of a plane, results in movement of the compass element relative to the compensating field so that the compensation is no longer complete. In the second place, such a compass is often of the remote receiving type in which the compass element is located a considerable distance from the indicator. In such an installation, the adjustment of the compensating magnets must be made at the remote point while the effect of such adjustment is observed at the local indicator, thus greately increasing the difficulty of adjustment. Furthermore, particularly when such a compass is utilized in an aircraft, the compass element is often positioned at a point of restricted accessibility as, for example, in a wing, so that it become difficult to adjust the compass, particularly under actual flight conditions.

It is an object of the invention, therefore, to provide a new and improved earth-inductor compass including provisions for compensating for local permanent magnetic fields, at the same time obviating one or more of the above-named disadvantages of the compensating arrangements of the prior art.

It is another object of the invention to provide a new and improved earth-inductor compass, including provisions for compensating for local permanent magnetic fields which may be effected readily at the indicator under actual operating conditions and in which the compensation is substantially unaffected by changes in the attitude of the vehicle on which the compass is mounted.

It is a further object of the invention to provide a new and improved earth-inductor compass including provisions for compensating for local permanent magnetic fields electrically and without the necessity of adjustable permanent magnets in the immediate vicinity of the compass element.

In accordance with the invention, an earth-inductor compass for use on a mobile craft comprises an inductor element for generating a first alternating-current electrical signal representative of the resultant of the earth's field and any extraneous permanent field and means for deriving a plurality of time-phase-displaced auxiliary alternating-current electrical signals synchronous with the first signal, the resultant of which is equal in amplitude and opposite in phase to that of a component of the first signal due to extraneous permanent field. The compass also includes means for vectorially combining the auxiliary signals and the first signal to develop an alternating-current electrical signal the phase of which is representative of the true magnetic heading of the craft.

For a better understanding of the invention, together with other and further objects thereof, reference is had to the following description taken in connection with the accompanying drawing, while its scope will be pointed out in the appended claims.

Figure 1:
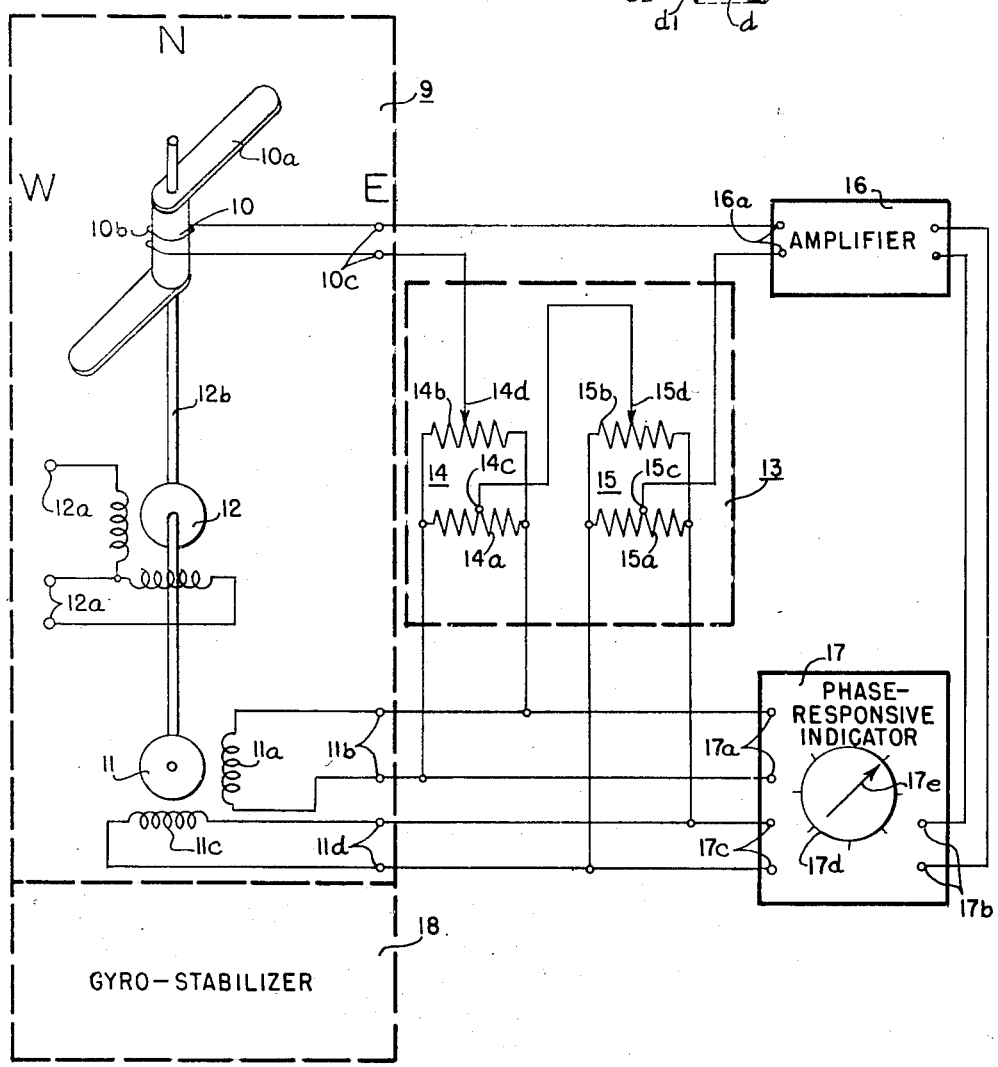

Referring now to the drawing, Fig. 1 is a diagram, partly schematic, of an earth-inductor compass for use in a mobile craft or vehicle and comprising the compensating system of the invention, while Fig. 2 is a vector diagram to aid in explaining the invention.

Referring now to Fig. 1 of the drawing, the earth-inductor compass there represented comprises a compass unit 9 including an inductor element 10 for generating an alternating-current signal representative of the resultant of the earth's magnetic field and any extraneous permanent field. The inductor element or some component thereof is generally rotated or otherwise driven, or excited mechanically, electrically, or magnetically, at a substantially constant or reference speed or frequency. Specifically, the inductor element 10 includes a rotatable Z-shaped magnetic core element 10a about the central leg of which is disposed a stationary winding 10b connected to terminals 10c at which, upon rotation of the core element 10a, the desired output signal appears. The compass unit 9 also includes means for generating a reference alternating-current signal; for example, a two-phase alternating-current generator 11 provided with a first-phase winding 11a connected to output terminals 11b and a second-phase winding 11c connected to output terminals 11d. The unit 9 also includes means for driving the core element 10a and the reference generator 11 synchronously. As illustrated, this means comprises a common driving motor 12, preferably of the synchronous type and energized from supply circuit terminals 12a, the motor 12 driving the element 10a and the generator 11 through a common shaft 12b.

The earth-inductor compass of the invention also comprises a compensating unit 13 including means for deriving at least one auxiliary signal synchronous with that generated by the inductor element 10 and equal in amplitude and opposite in phase to that of a component of the signal developed by the inductor element 10 due to an extraneous permanent field. Preferably, the auxiliary signal comprises a plurality of polyphase signals, the resultant of which is equal and opposite to the resultant component of the first signal developed by the inductor element 10 due to all extraneous permanent fields; specifically, the auxiliary signal is a two-phase signal which may be derived from the reference generator 11 as illustrated, or from any source synchronous therewith. Means such as a first reversible-polarity voltage divider 14 is connected across the terminals 11b for deriving from such phase of the generator 11 a first auxiliary signal which is adjusted to be equal in amplitude and opposite in phase to that of the component of the signal developed by the inductor element 10 due to all extraneous field components along the transverse axis of the craft on which the compass is mounted. The compensating unit 13 also includes means such as a second reversible-polarity voltage divider 15 connected across the terminals 11d for deriving from the phase 11c of the generator a second auxiliary signal equal in amplitude and opposite in phase to that of the component of the signal developed by the inductor element 10 due to all permanent field components along the longitudinal axis of the craft on which the earth-inductor compass is carried. The reversible-polarity voltage divider 14 comprises a resistor 14a connected in parallel with a resistor 14b, the output terminals of the divider being a fixed electrical mid-terminal 14c on the resistor 14a and an adjustable contact element 14d on the resistor 14b. The reversible-polarity voltage divider 15 is similar to the voltage divider 14 and the corresponding elements are indicated by the same letter subscripts.

The earth-inductor compass of the invention also includes circuit means for modifying the signal developed by the inductor element 10 by the auxiliary polyphase signals developed at the output terminals of the voltage dividers 14 and 15. Specifically, the signal output of inductor element 10 appearing at the terminals 10c is connected in series with the signal outputs of the voltage dividers 14 and 15 so that these three signals are vectorially combined to produce a signal the phase of which is representative of the true magnetic heading of the craft. This signal is applied to the input terminals 16a of an amplifier 16, the output circuit of which is connected to means responsive to the relative phase of this resultant signal applied to the terminals 16a and that of one of the signals developed by the reference generator 11 for developing an effect, for example, a visual indication, representative of the true magnetic bearing of the craft. This latter means may be a phase-responsive indicator 17 of any well-known type having input terminals 17a and 17c to which the signals of the phases 11a and 11c, respectively of the generator 11 are applied and input terminals 17b to which the signal output of the amplifier 16 is applied. The phase-responsive device is provided with a suitable scale or compass card 17d and a cooperating rotatable element 17e simulating a compass needle and cooperating with the scale 17d to indicate visually the bearing of the craft. In practice, the compass unit 9 may be supported from a gyrostabilizer 18 to maintain the axis of rotation of the compass unit in the true vertical so that the inductor element 10 is responsive at all times only to the horizontal component of the earth's magnetic field.

In considering the operation of the earth-inductor compass described and neglecting first the compensating system 13, the compass unit 9 is effective to develop at the terminals 10c an alternating-current signal of substantially constant amplitude and of a phase with reference to the alternating-current signals developed by the generator 11 which varies in accordance with the heading of the craft on which the unit is mounted. The two reference signals from generator 11 are applied to the input circuits 17a and 17c of the phase-responsive device 17 while the variable-phase signal from amplifier 16 is applied to terminals 17b so that the device 17 constitutes essentially a self-synchronous phase indicating device which produces a deflection of the indicator 17e which varies with the phase relation between the variable-phase signal and the two reference signals and which is representative of the heading of the craft.

However, in a system of the type described above, it is well known that spurious permanent magnetic fields in the vicinity of the compass, such as the field due to permanent magnetization of the craft on which the compass is mounted, tend to combine with the earth's magnetic field to produce a resultant magnetic field which is angularly displaced from the true magnetic north, the angular displacement of which varying with the heading of the craft. Thus the indication of the indicator element 17e would, without more, be an indication only of the resultant of the earth's magnetic field and any extraneous permanent field, that is, the apparent magnetic field, in the vicinity of the compass and not of the heading of the craft relative to the true magnetic north.

In the adjustment of the compensating system 13 of the invention, the craft is first headed in a true magnetic north direction and the adjustable element of one of the voltage dividers, for example the adjustable contact 14d of voltage divider 14 is adjusted to develop an alternating-current signal which combines vectorially with the signal developed by the inductor element 10, to produce a true magnetic north indication by the indicator 17e of the phase-responsive device 17. Thereafter, the craft is headed in a magnetic south direction and the voltage divider 14 is readjusted so that any error on this heading is reduced by half. The corresponding procedure is followed on the magnetic east and west headings using the voltage divider 15. By this procedure the errors are reduced as much as possible. Any residual errors are due to effects other than the extraneous local permanent field, for example, to the soft-iron effect.

The relationships described may be better understood by reference to the vector diagram of Fig. 2 in which the vector $a$ represents the desired signal output of the inductor element 10 for true magnetic north. The vector $b$ represents the signal output of inductor element 10 for a given heading. However, the phase of this signal does not represent the true course of the craft, due to the presence of a permanent magnetic field in the vicinity of the compass which causes the inductor element to generate a spurious signal component represented by the vector $c$. This component may be resolved into components $c_1$ and $c_2$ due to components of the permanent field along the longitudinal and transverse axes of the craft, respectively. The voltage dividers 14 and 15 are adjusted so that the signals developed between their output terminals 14c, 14d and 15c, 15d are equal in magnitude and opposite in phase to the signals $c_2$ and $c_1$ as represented by the vectors $d_2$ and $d_1$, respectively. The resultant of these two signals is represented by the vector $d$ and this in turn is vectorially combined with the signal $b$, the resultant of the two being represented by the vector $e$, the phase of which with respect to the signal $a$, corresponding to true magnetic north, is accurately representative of the true magnetic heading or course of the craft. Thus, signal $e$ is that applied to the input terminals 16a of amplifier 16 and, as amplified, to the input terminals 17b of the device 17. The signal inputs to terminals 17a and 17c of the device 17 produce a rotating field the phase of which is represented by vector $a$ and the device 17 is effective to respond to the difference in phase between these two vectors and to indicate this phase difference by the position of the indicator 17e. It will be understood that, if the local permanent field is only along the longitudinal or transverse axis of the craft, the auxiliary signal voltage divider 14 or 15, as the case may be, may be omitted.

Thus, it is seen that, in the earth-inductor compass embodying the compensating system described, the device 17 will at all times give an indication of the heading of the craft relative to magnetic north free from local permanent field errors. At the same time, the compass unit 9 may be supported on the gyrostabilizer 18 and may be located at any suitable point on the craft no matter how remote or inaccessible, while the compensating system 13 may be located adjacent the indicator device 17 where it is readily accessible and where adjustments of the voltage dividers 14 and 15 may be readily made during calibration of the compensating system under actual operating conditions, while continuously observing the effects of such adjustment on the indicator 17 to facilitate a rapid compensation of the compass. It will be understood that, if the nature of the local permanent fields tends to vary over periods of time, the compass may be readily recompensated as described above.

It is to be noted that if the compensating system of the invention is combined with the conventional soft-iron compensating system, which generally consists of positioning soft iron spheres in the vicinity of the compass, the complete compensating procedure is greatly simplified. This is because the two compensations can be made independently since there is no interaction between the two compensating systems, which is not true when the permanent-field compensation is made magnetically.

While there has been described what is at present considered to be the preferred embodiment of the invention, it will be apparent to those skilled in the art that various changes and modifications may be made therein without departing from the spirit or scope of the invention.

What is claimed as new is:

1. An earth-inductor compass for use on a mobile craft comprising, an inductor element for generating a first alternating-current electrical signal representative of the resultant of the earth's field and any extraneous permanent field, means for deriving a plurality of time-phase-displaced auxiliary alternating-current electrical signals synchronous with said first signal the resultant of which is equal in amplitude and opposite in phase to that of the component of said first signal due to all extraneous permanent fields, and means for vectorially combining said auxiliary signals and said first signal to develop an alternating-current electrical signal the phase of which is representative of the true heading of the craft.

2. An earth-inductor compass for use on a mobile craft comprising, an inductor including a driven element for generating a first alternating-current signal representative of the resultant of the earth's field and any extraneous permanent field, a reference second alternating-current signal generator, a common driving means for said element and said generator, means for deriving from said generator at least one auxiliary signal equal in amplitude and opposite in phase to that of a component of said first signal due to said extraneous permanent field, circuit means for vectorially combining said auxiliary signal and said first signal to produce a third signal, and means responsive to the relative phase of said second and third signals for developing an effect representative of the true heading of said craft.

3. An earth-inductor compass for use on a mobile craft comprising, an inductor element for generating a first alternating-current electrical signal representative of the resultant of the earth's field and any extraneous permanent field, means for generating a reference second alternating-current signal synchronous with said first signal, means for deriving a plurality of time-phase-displaced auxiliary alternating-current electrical signals synchronous with said first signal the resultant of which is equal in amplitude and opposite in phase to that of the component of said first signal due to said extraneous field, circuit means for vectorially combining said auxiliary signals and said first signal to produce a third signal, and means responsive to the relative phase of said second and third signals for developing an effect representative of the true heading of said craft.

4. An earth-inductor compass for use on a mobile craft comprising, an inductor including a driven element for generating a first alternating-current signal representative of the earth's field and any extraneous permanent field, a reference two-phase second alternating-current signal generator, a common driving means for said element and said generator, means for deriving from one phase of said generator a first auxiliary signal equal in amplitude and opposite in phase to that of the component of said first signal due to all extraneous permanent field components along the longitudinal axis of the craft, means for deriving from the other phase of said generator a second auxiliary signal equal in amplitude and opposite in phase to that of the component of said first signal due to all permanent field components along the transverse axis of the craft, circuit means for vectorially combining said auxiliary signals and said first signal to produce a third signal, and means responsive to the relative phase of said third signal and one of said auxiliary signals for developing an effect representative of the true heading of said craft.

5. An earth-inductor compass for use on a mobile craft comprising, an inductor including a driven element for generating a first alternating-current signal representative of the resultant of the earth's field and any extraneous permanent field, a reference two-phase second alternating-current signal generator, a common driving means for said element and said generator, a first reversible-polarity voltage divider for deriving from one phase of said generator a first auxiliary signal equal in amplitude and opposite in phase to that of the component of said first signal due to all extraneous permanent field components along the longitudinal axis of the craft, a second reversible-polarity voltage divider for deriving from the other phase of said generator a second auxiliary signal equal in amplitude and opposite in phase to that of the component of said first signal due to all permanent field components along the transverse axis of the craft, circuit means for vectorially combining said auxiliary signals and said first signal to produce a third signal, and means responsive to the relative phase of said third signal and one of said auxiliary signals for developing an effect representative of the true heading of said craft.

6. In an earth-inductor compass for use on a mobile craft and including an inductor element for generating a first alternating-current electrical signal representative of the resultant of the earth's field and any extraneous permanent field, means for generating a reference second alternating-current signal, and means responsive to the relative phase of said first and second signals for developing an effect representative of the heading of said craft, a system for correcting said effect for said extraneous permanent field introducing an error in said effect comprising, means for developing a plurality of time-phase-displaced auxiliary alternating-current electrical signals synchronous with said first signal the resultant of which is equal in amplitude and opposite in phase to that of the component of said first signal due to said extraneous field, and circuit means for vectorially combining said auxiliary signals and said first signal before application to said phase-responsive means.

HARRY W. PHAIR.

REFERENCES CITED

The following references are of record in the file of this patent:

UNITED STATES PATENTS

| Number | Name | Date |
|---|---|---|
| 1,774,458 | Tear | Aug. 26, 1930 |